United States Patent
Plant

(10) Patent No.: US 8,807,481 B2
(45) Date of Patent: Aug. 19, 2014

(54) AIRCRAFT SEATING ARRANGEMENT AND SEAT

(71) Applicant: B/E Aerospace, Inc., Wellington, FL (US)

(72) Inventor: Tommy George Plant, Advance, NC (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 13/963,424

(22) Filed: Aug. 9, 2013

(65) Prior Publication Data

US 2013/0320724 A1   Dec. 5, 2013

Related U.S. Application Data

(63) Continuation of application No. 12/039,000, filed on Feb. 28, 2008, now abandoned.

(60) Provisional application No. 60/992,858, filed on Dec. 6, 2007.

(51) Int. Cl.
*B64D 13/00* (2006.01)
*B64D 11/06* (2006.01)

(52) U.S. Cl.
USPC .................................................... 244/118.6

(58) Field of Classification Search
USPC ................................................ 244/118.5, 118.6
See application file for complete search history.

(56) References Cited

U.S. PATENT DOCUMENTS

| 2,947,349 A * | 8/1960 | Kryter .................. 297/174 R |
| 4,936,620 A * | 6/1990 | Francois et al. ............. 296/64 |
| 7,780,115 B2 * | 8/2010 | Watanabe ............... 244/118.6 |
| 2007/0040434 A1 * | 2/2007 | Plant ................... 297/354.13 |
| 2007/0241232 A1 * | 10/2007 | Thompson ............ 244/118.6 |
| 2008/0042010 A1 * | 2/2008 | Watanabe ............. 244/118.6 |

FOREIGN PATENT DOCUMENTS

| GB | 2438162 A | 11/2007 |
| WO | 2005014395 A1 | 2/2005 |
| WO | WO 2005075289 A1 * | 8/2005 ............. B64C 11/06 |

OTHER PUBLICATIONS

Summons to Attend Oral Proceedings Pursuant to Rule 115 (1) EPC, Date: Nov. 8, 2012, BE Aerospace, Inc., EP Application No. 08731205.4.
Decision to Grant, Date: Aug. 1, 2013, BE Aerospace, Inc., EP Application No. 08731205.4.

* cited by examiner

*Primary Examiner* — Philip J Bonzell
(74) *Attorney, Agent, or Firm* — Shumaker, Loop & Kendrick, LLP

(57) ABSTRACT

An aircraft seating arrangement including pairs of seat groupings arranged with the seats of each seat grouping parallel with the other, and with each seat and seat pair positioned at an offset angle in relation to the longitudinal axis of the cabin. Privacy shells enclose the seats and include amenities such as a viewing monitor, and accommodation for the feet and lower legs when the seat is in the lie-flat condition.

4 Claims, 9 Drawing Sheets

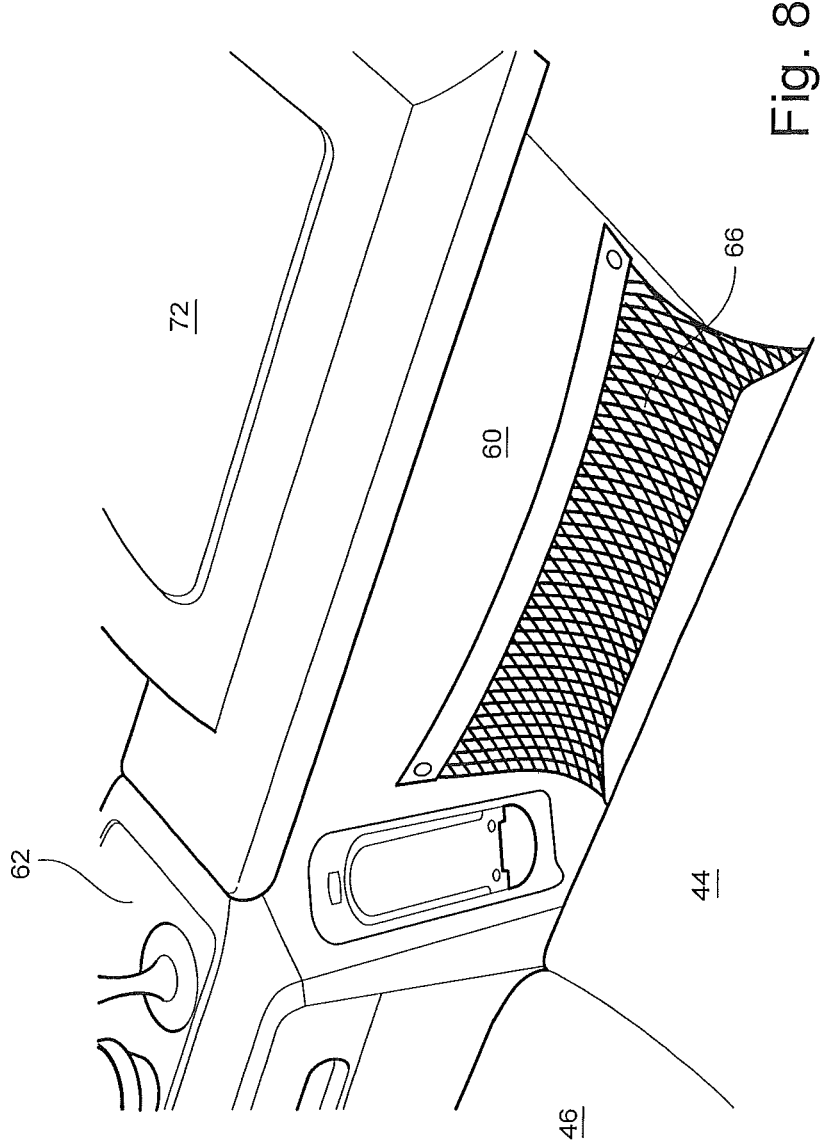

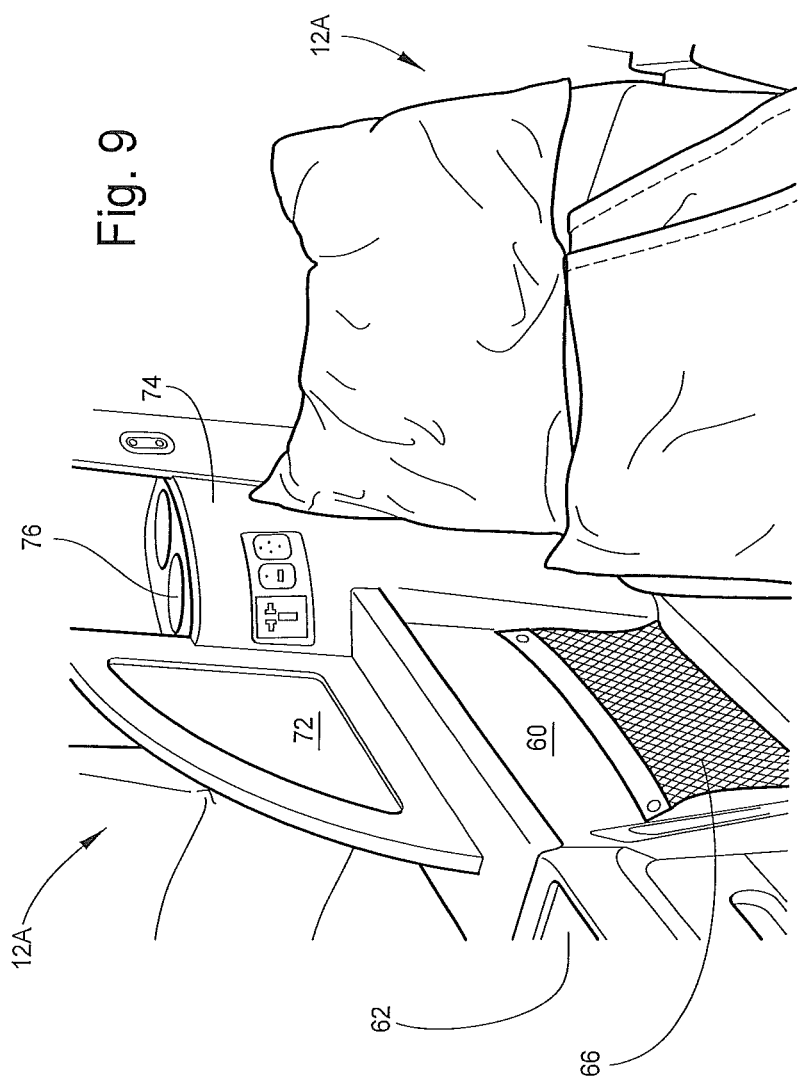

AIRCRAFT SEATING ARRANGEMENT AND SEAT

CROSS-REFERENCE TO RELATED APPLICATION

This continuation application claims priority to U.S. application Ser. No. 12/039,000 filed Feb. 28, 2008, which claims priority to U.S. Application No. 60/992,858 filed Dec. 6, 2007, the contents of which are incorporated by reference herein.

TECHNICAL FIELD AND BACKGROUND OF THE INVENTION

This invention relates to aircraft passenger seating, and more particularly to an angled aircraft seating arrangement. Long-haul aircraft flights regularly fly non-stop to destinations 12-18 hours or more away from the origination. At present, first class cabins provide various forms of "sleeper seats", by which is meant that the seat back reclines to the point where the seat occupant is able to assume a prone or nearly-prone position. In some cases the seats form a horizontal sleeping surface, and in other cases the head end of the reclined seat is raised to some degree above the foot end, or there still exists a relatively shallow angle between the seat bottom and seat back. The seats are generally parallel with the center line axis of the aircraft. Some prior art seating arrangements have various types of offset seats, including so-called "herringbone" arrangements, as well as seats and seat groupings that are staggered in relation to each other to provide privacy, greater legroom, aisle access, as well as enhanced density consistent with these other objectives.

This application discloses an enhanced seating arrangement that provides privacy, greater legroom, a true lie-flat seat in an efficient and ergonomic seat and seat grouping. In contrast to some other seating arrangements, where seats are substantially offset from each other or even facing each other, the arrangement disclosed in this application presents an appearance and functionality that in some respects is similar to more conventional seating configurations, preserves adequate aisle space and yet still provides modern ergonomic, comfort and space-saving features not found in conventional seating arrangements.

BRIEF SUMMARY OF THE INVENTION

Therefore, it is an object of the present invention to provide a seat and seating arrangement for a passenger aircraft that permits greater seating density within a predetermined cabin area.

It is another object to provide a seat and seating arrangement that permits a longer, lie-flat seat within a predetermined cabin area.

It is another object to provide a seat and seating arrangement that combines passenger privacy features for a passenger and entertainment and comfort features for an aft-seated passenger in a single seating unit.

These objects are addressed by the present invention, which provides an arrangement of seats disposed in a particular angled configuration that allows efficient placement of the seats in an aircraft cabin and optimized comfort for and utilization by the passenger. The aircraft seating arrangement includes pairs of seat groups arranged with the seats of each seat group parallel with the other, and with each seat and seat pair positioned at an offset angle in relation to the longitudinal axis of the cabin. In one optional embodiment, privacy shells enclose the seats and include amenities such as a TV monitor, and accommodation for the feet and lower legs when the seat is in the lie-flat condition.

According to one preferred embodiment of the invention, an aircraft passenger seating arrangement is provided that includes a first group of adjacent, spaced-apart and parallel seats adapted for being positioned at an offset angle in relation to a longitudinal axis of an aircraft cabin, and a second group of adjacent, spaced-apart and parallel seats, each of the second group of seats adapted for being positioned parallel with, and aft of, the first group of adjacent seats and at an offset angle in relation to a longitudinal axis of an aircraft cabin.

According to one preferred embodiment of the invention, the first group of seats and the second group of seats each comprise pairs of seats.

According to another preferred embodiment of the invention, the offset angle is about 15 degrees.

According to yet another preferred embodiment of the invention at least one seat of the second group of seats defines a longitudinally-extending axis that extends between two seats of the first group of seats.

According to yet another preferred embodiment of the invention, at least one seat of the second group of seats includes an extendable foot rest that, when extended, is positioned at least in part between the two seats of the first group of seats.

According to yet another preferred embodiment of the invention, the seating arrangement includes a third group of adjacent, spaced-apart and parallel seats adapted for being positioned at an offset angle in relation to a longitudinal axis of an aircraft cabin, a fourth group of adjacent, spaced-apart and parallel seats adapted for being positioned parallel with, and aft of, the third group of adjacent seats and at an offset angle in relation to a longitudinal axis of an aircraft cabin, wherein the third and fourth groups of seats are adapted for being positioned laterally adjacent to the first and second groups of seats.

According to yet another preferred embodiment of the invention, the third and fourth groups of seats are adapted for being positioned in an aircraft cabin in parallel relation to the first and second groups of seats.

According to yet another preferred embodiment of the invention, the third and fourth groups of seats are adapted for being positioned in an aircraft cabin in relation to the first and second groups of seats at an offset angle in relation to an longitudinal axis of an aircraft cabin that is equal and opposite to the offset angle of the first and second groups of seats.

According to yet another preferred embodiment of the invention, the seating arrangement includes a fifth group of adjacent, spaced-apart and parallel seats adapted for being positioned at an offset angle in relation to a longitudinal axis of an aircraft cabin, a sixth group of adjacent, spaced-apart and parallel seats adapted for being positioned parallel with, and aft of, the fifth group of adjacent seats and at an offset angle in relation to a longitudinal axis of an aircraft cabin, wherein the fifth and sixth groups of seats are adapted for being positioned in the aircraft cabin in relation to the first, second, third and fourth groups of seats at an offset angle in relation to a longitudinal axis of the aircraft cabin that is equal to the offset angle of one of the first and second, and third and fourth groups of seats, and equal and opposite to the other of the first and second, and third and fourth groups of seats.

According to yet another preferred embodiment of the invention, an aircraft passenger seating unit is provided, including a seat, having a seat back, seat bottom, an extendable footrest moveable between a stowed position and a forwardly-extended use position, and fittings for attaching the seat to the deck of an aircraft at a predetermined offset angle in relation to a longitudinal axis of an aircraft cabin of the aircraft, the extendable footrest in the use position adapted for being positioned at least partially between two other like forwardly-positioned seating units positioned on the deck at the same predetermined offset angle as the seating unit.

According to yet another preferred embodiment of the invention, the aircraft seating unit includes a stationary privacy shell for being positioned in partial surrounding relation to the seat, the privacy shell having a storage cabinet for use by a passenger seated in the seat, a center console for providing separation between the seating unit and an adjacent seating unit, and a viewing monitor positioned in a monitor housing, the monitor housing positioned and facing aft of the seating unit and offset at the same predetermined offset angle in relation to a longitudinal axis of an aircraft cabin of the aircraft as the seating unit for permitting viewing by a passenger seated in a like aft-positioned seating unit positioned on the deck at the same predetermined Offset angle as the seating unit.

According to yet another preferred embodiment of the invention, the offset angle is about 15 degrees.

According to yet another preferred embodiment of the invention, the seat defines an offset, longitudinally-extending axis that is predetermined to intersect the viewing monitor of a forwardly-positioned like seating unit.

According to yet another preferred embodiment of the invention, the seat set includes a plurality of subsets of seats, wherein each of the subsets of seats includes a first group of adjacent, spaced-apart and parallel seats adapted for being positioned at an offset angle in relation to a longitudinal axis of an aircraft cabin, a second group of adjacent, spaced-apart and parallel seats, each of the second group of seats adapted for being positioned parallel with, and aft of, the first group of adjacent seats and at an offset angle in relation to a longitudinal axis of an aircraft cabin, a third group of adjacent, spaced-apart and parallel seats adapted for being positioned at an offset angle in relation to a longitudinal axis of an aircraft cabin, a fourth group of adjacent, spaced-apart and parallel seats adapted for being positioned parallel with, and aft of, the third group of adjacent seats and at an offset angle in relation to a longitudinal axis of an aircraft cabin, the third and fourth groups of seats being adapted for being positioned laterally adjacent to the first and second groups of seats, a fifth group of adjacent, spaced-apart and parallel seats adapted for being positioned at an offset angle in relation to a longitudinal axis of an aircraft cabin, a sixth group of adjacent, spaced-apart and parallel seats adapted for being positioned parallel with, and aft of, the fifth group of adjacent seats and at an offset angle in relation to a longitudinal axis of an aircraft cabin, wherein the fifth and sixth groups of seats are adapted for being positioned in the aircraft cabin in relation to the first, second, third and fourth groups of seats at an offset angle in relation to a longitudinal axis of the aircraft cabin that is equal to the offset angle of one of the first and second, and third and fourth groups of seats, and equal and opposite to the other of the first and second, and third and fourth groups of seats.

According to yet another preferred embodiment of the invention, the first group of seats and the second group of seats each comprise pairs of seats.

According to yet another preferred embodiment of the invention, at least one seat of the second group of seats defines a longitudinally-extending axis that extends between two seats of the first group of seats.

According to yet another preferred embodiment of the invention, at least one seat of the second group of seats includes an extendable foot rest that, when extended, is positioned at least in part between the two seats of the first group of seats.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 8 is a partial front-facing view according to FIG. 7 showing the center console and privacy divider; and FIG. 9 is a front view of one outboard side of the cabin showing the aisle seat in a lie-flat position.

DETAILED DESCRIPTION OF THE INVENTION

Figure 1:
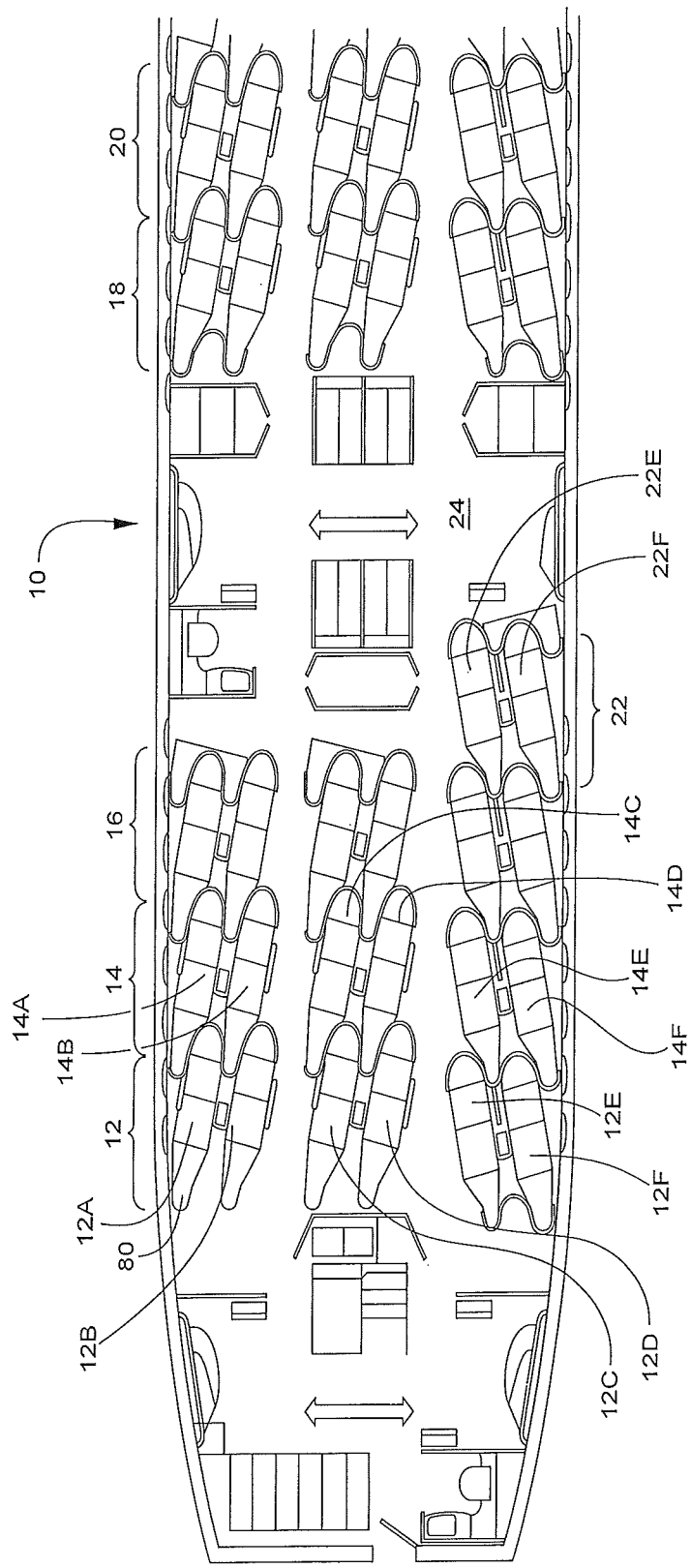
FIG. 1 is a fragmentary top plan view of a portion of an aircraft cabin fitted with seats having an arrangement according to one embodiment of the invention.

Referring to the drawings, FIG. 1 illustrates a passenger seat set 10 that is comprised of seat rows 12, 14, 16, 18, 20 and 22 that collectively define the set 10, i.e, the totality of illustrated seats and rows that make up the seating accommodations in an aircraft cabin 24, part of which is shown in FIG. 1. The seat rows 12, 14, 16, 18, 20 and 22 extend laterally across the aircraft cabin 24 between port and starboard sides, as viewed facing forward in the cabin 24. The seat rows 12 and 14 are hereafter used for illustrative purposes and include seats 12A, 12B, 12C, 12D, 12E, 12F, and 14A, 14B, 14C, 14D, 14E, 14F, respectively, grouped in pairs. It is understood that in the following descriptions the arrangement of these rows 12 and 14 are illustrative of the remaining rows 16, 18, and 20 according to one embodiment of the invention and form a subset of the set 10. However, as is indicated by the row 22, partial rows are possible to take into account placement of bulkheads, meal service equipment, restrooms and the like, as are full rows with all seats angled in the same direction, or with the outboard seat groups angled with respect to the longitudinal axis of the cabin 24 and the center groups aligned with the longitudinal axis of the cabin 24. Other arrangements are possible, including rows with four or more seat groups, and rows with seat groups having differing numbers of seats per seat group.

With these points in mind, further reference to FIG. 1 illustrates that rows 12 and 14 each have six seats in three groups of two seats. In row 12, seats 12A, 12B make up the starboard group, seats 12C, 12D make up the center group, and seats 12E, 12F make up the port group. Similarly, In row 14, seats 14A, 14B make up the starboard group, seats 14C, 14D make up the center group, and seats 14E, 14F make up the port group.

Figure 2:
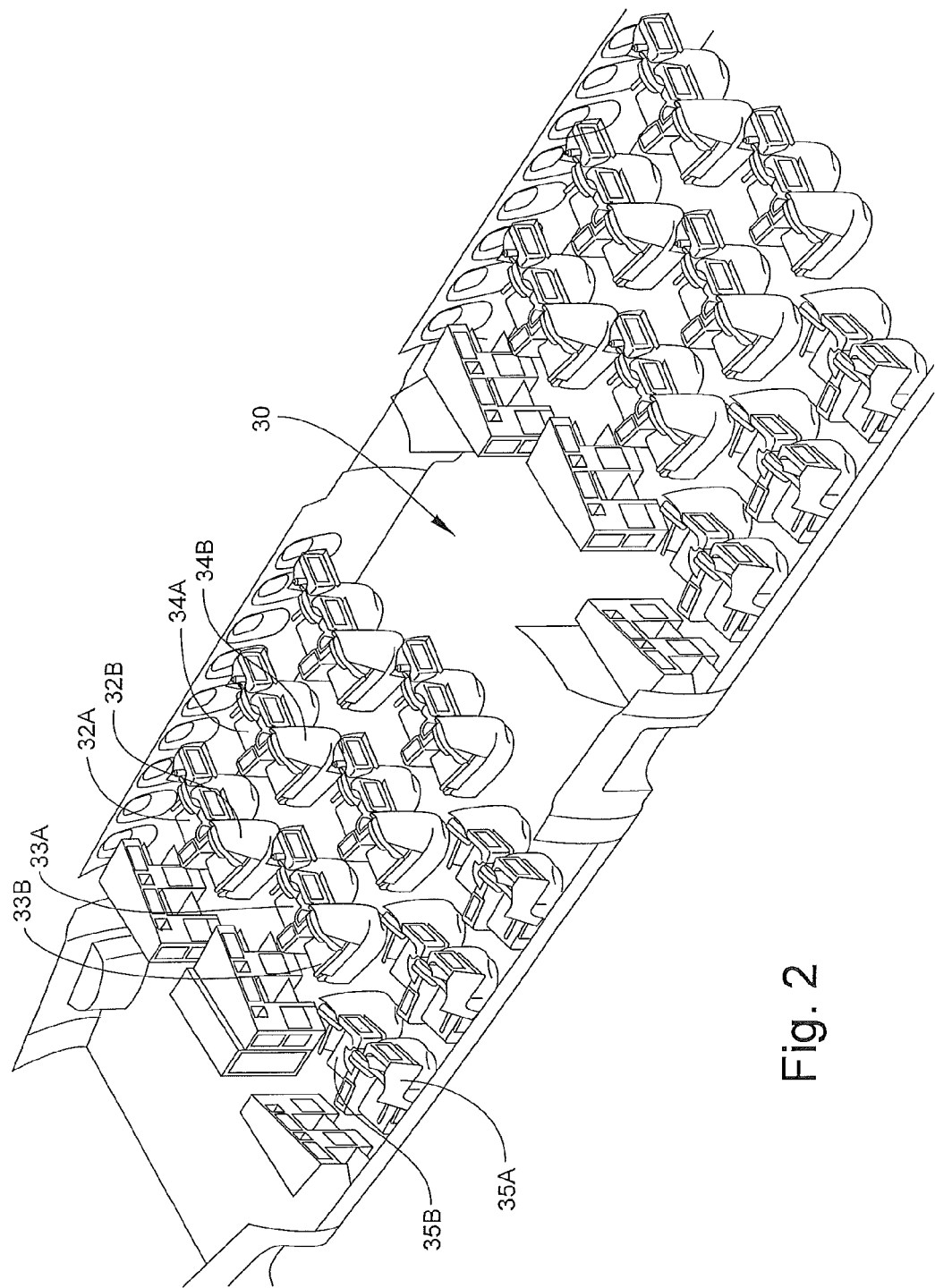
FIG. 2 is a top perspective view of an aircraft cabin fitted with seats having an arrangement according to another related embodiment of the invention.

The above-identified groups are arranged with the seats of each seat group parallel with the other, and with each seat and seat group positioned at an offset angle in relation to the longitudinal axis of the cabin. For example, seats 12A and 12B are adjacent to each other, spaced-apart from each other and extend along a parallel axis. Seats 12C and 12D similarly are adjacent to each other, spaced-apart from each other and extend along a parallel axis, as are seats 12E, 12F that make up the third seat group of row 12. However, seats 12A-12F are not all parallel to each other. Rather, in the embodiment shown in FIGS. 1 and 2, seats 12A, 12B and seats 12C, 12D are parallel to each other in that they are all positioned at the same offset angle with relation to the longitudinal axis of the cabin 24. Seats 12E, 12F, on the other hand, are positioned at an offset angle that is the same as, but opposite to, the other seats in row 12. In FIGS. 1 and 2, the angle of offset is 15 degrees; so that seats 12A, 12B, 12C and 12D are positioned parallel to each other and positioned at a 30 degree angle with reference to seats 12E, 12F. Rows 14, 16, 18 and 20 are identically arranged. The seats 22E and 22F of row 22 are aligned parallel to the seats 12E, 12F of row 12.

The 15 degree angle of offset is illustrative of various offsets as may be required or desirable based on seat size, seat pitch, seat density, aisle width, cabin length and cabin width. The result of this arrangement is that either the same number of seats can be made somewhat longer than would be possible if the seats were aligned with the longitudinal axis of the cabin 24, or more seats can be fitted into a cabin than if they were aligned with the longitudinal axis of the cabin 24.

While the adjacent seats of each group, for example seats 12A, 12B are positioned with seat 12A being positioned so that the occupant is seated slightly forward of seat 12B, the offset is not sufficiently great to prevent convenient conversation and other interaction between passengers seated in adjacent seats.

Referring now to FIG. 2, a similar seating arrangement embodiment is shown. A seat set 30 is shown that includes groups of pairs of seats that are not arranged in laterally-extending rows as in FIG. 1, but are staggered in their side-to-side orientation so that the seats have the same relative positioning fore-and-aft but not the same lateral orientation. More specifically, for purposes of illustration seats 32A and 32B form a single seat group and are positioned at an offset angle similar to seats 12A and 12B in FIG. 1. As is shown, seats 32A, 32B are angled with the same offset angle as seats 33A, 33B but do not share the same "row" relationship with seats 33A, 33B. Seats 32A, 32B are, however, parallel in orientation with seats 33A, 33B, and 34A, 34B, Seats 35A, 35B have an offset equal and opposite to that of seats 33A, 33B, and 34A, 34B, so that they face outwardly to port whereas seats 33A, 33B, and 34A, 34B are offset so that they face outwardly to starboard.

The remaining seat groups shown in FIG. 2 bear the same relationship to each other as described above, and are therefore not further described.

Figure 5:
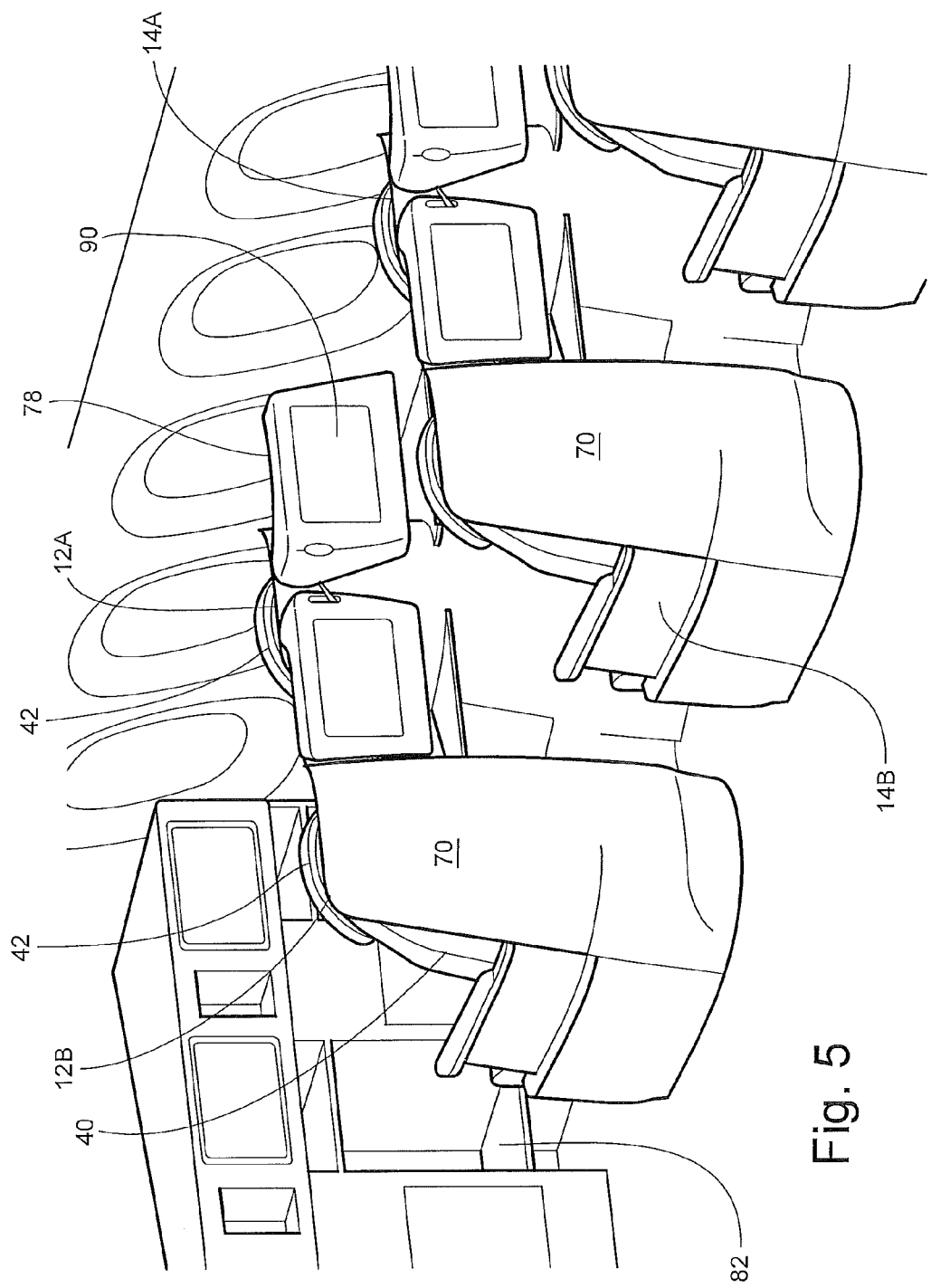
FIG. 5 is a partial rear perspective view of one outboard side of the cabin shown in FIG. 2.
Figure 7:
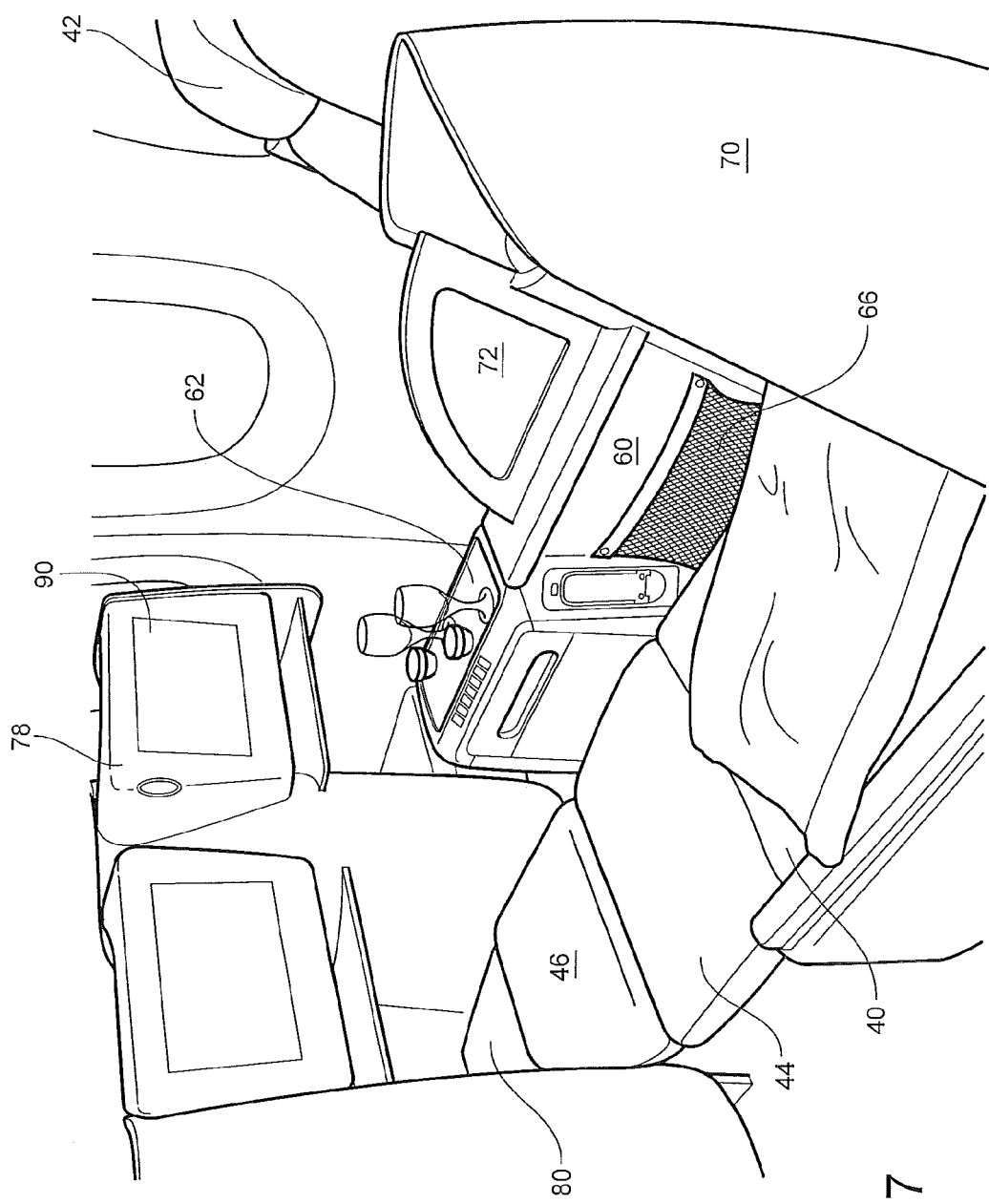
FIG. 7 is a rear view of one outboard side of the cabin showing the aisle seat in a lie-flat position.

As is best shown in FIGS. 5 and 7, the offset angle is sufficient to permit utilization of the space between two adjacent seats, for example seats 14A, 14B, by the aft-seated passenger in seat 16B, and the space between seat 14A and the fuselage by the aft-seated passenger in seat 16A, as explained in further detail below. Moreover, the aisles remain relatively straight and unencumbered, facilitating their use by the flight attendants and passengers going to and from the lavatories.

Figure 3:
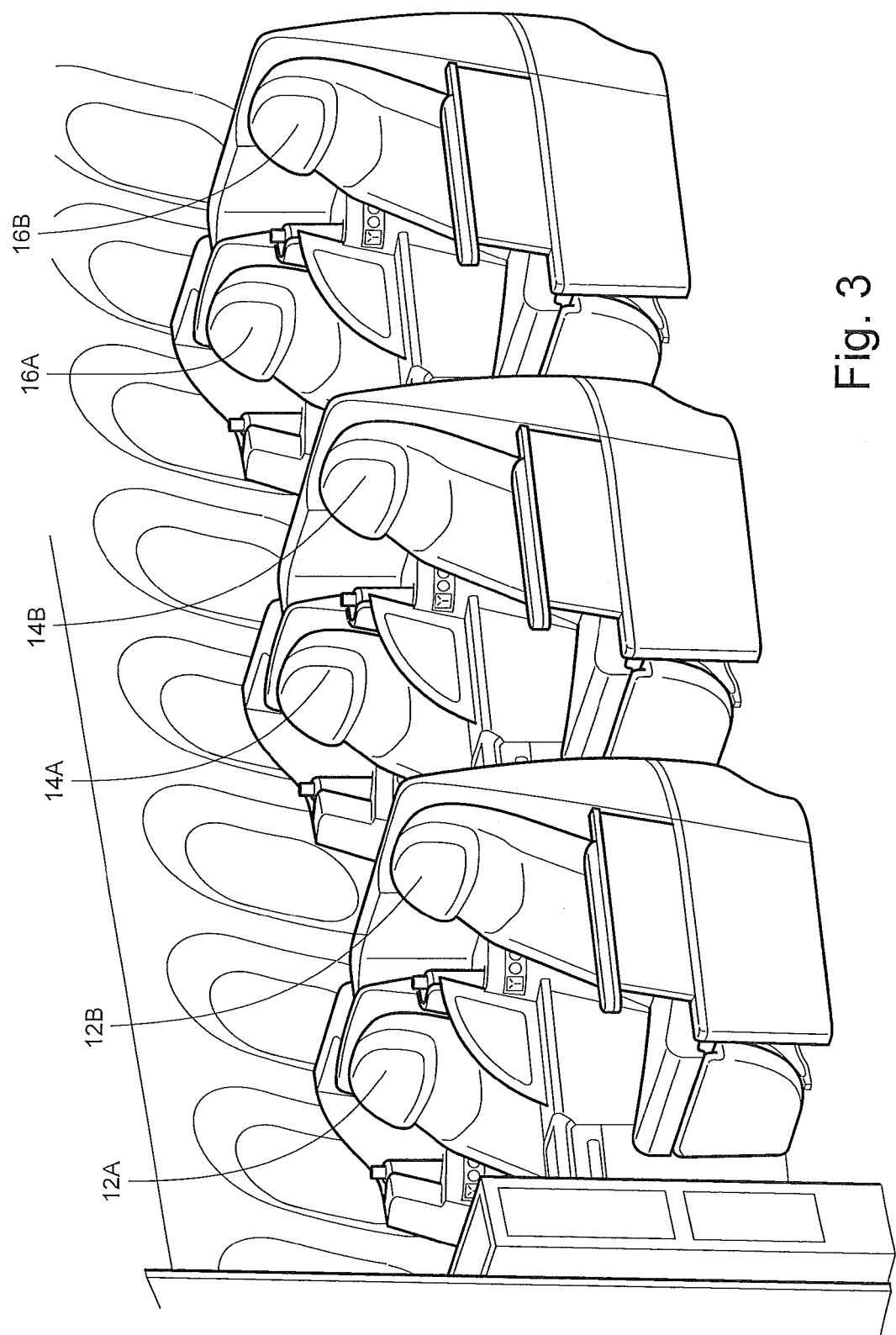
FIG. 3 is a partial front perspective view of one outboard side of the cabin shown in FIG. 2.

Referring now to FIG. 3, the seating arrangement is generally shown for purposes of illustration with reference to starboard seats 12A, 12B, 14A, 14B, 16A, 16B. As is more specifically shown in FIGS. 4-9, each of the seats 12A, 12B, 14A, 14B, 16A, 16B include a seat back 40, the upper portion of which defines a head rest 42, seat bottom 44, leg rest 46, and spaced-apart arm rests 48, 50. The seats are supported by frames which are in turn mounted to the deck of the aircraft by track fittings of a known type, and are separated by a console 60. Privacy shells 70 are provided which enclose the back and sides of the seats. The privacy shells 70 are configured to permit the occupant to see over and around the shells 70 when sitting upright, but to be shielded from view from the sides when in other positions. In addition, a privacy panel 72 is positioned between the adjacent seats 12A, 12B, 14A, 14B, 16A, 16B. The panel 72 is positioned so it is low enough to be seen over when the passengers are in an upright or partially-seated position, but will provide extra privacy when at least one of the passengers is in the lie-flat position. In some iterations the panel 72 may be constructed so it can be lowered into the console 60 between the seats, if desired. This console 60 also provides separation between adjacent passengers, a small cocktail area 62 for drinks and snacks, supports the center armrest 50, provides storage for a meal tray 64, a magazine stowage side pocket 66 (see FIGS. 6-9), and seat, entertainment and communication electronics.

Figure 4:
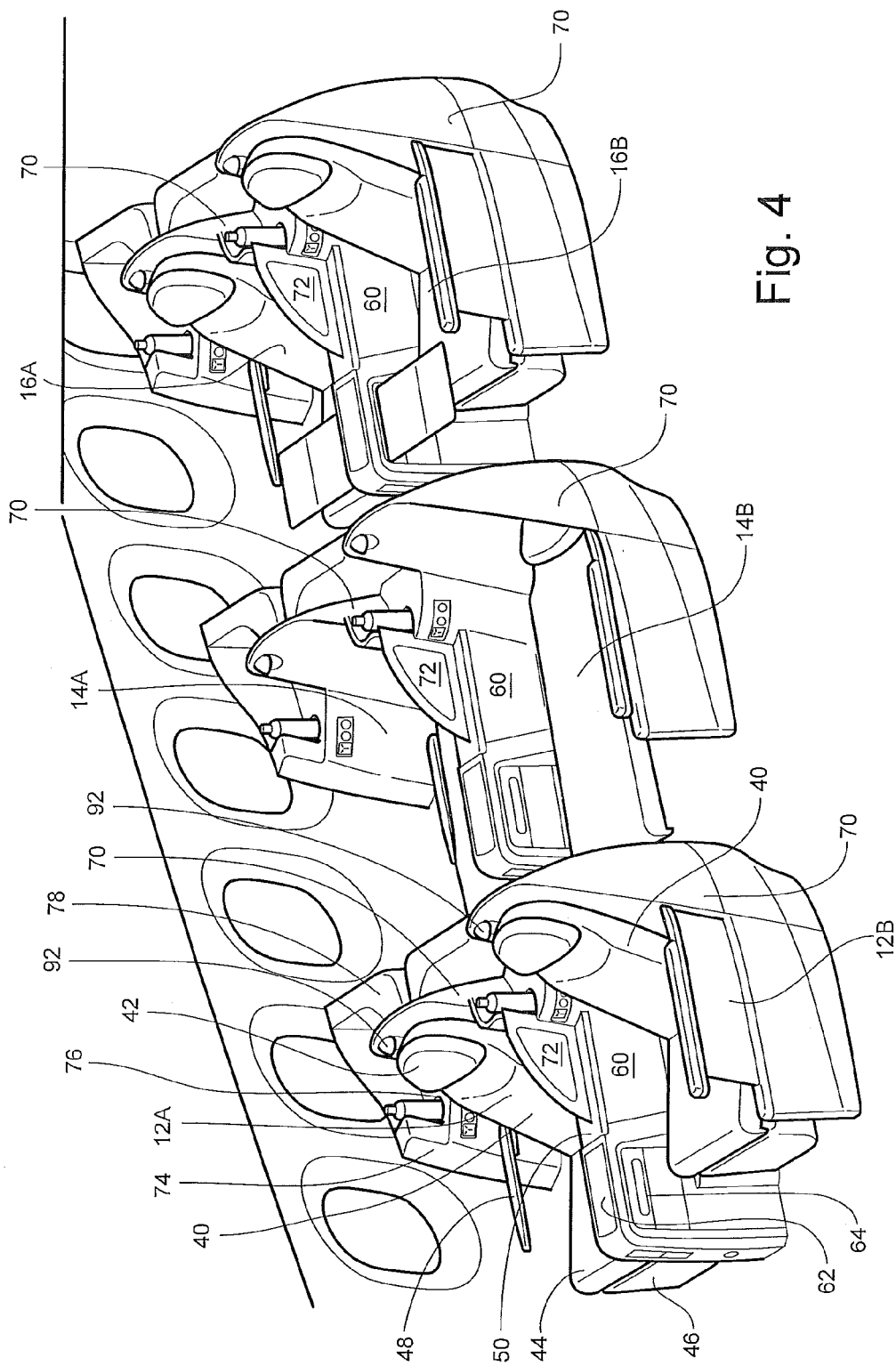
FIG. 4 is a partial top/side perspective view of the cabin shown in FIG. 2, with the seats removed from certain of the privacy shells in order to more clearly show details of the privacy shell.

As is best shown in FIG. 4, each shell 70 includes a storage cabinet 74 to the right or left of each seat within reach of the passenger while seated, and includes a recess 76 for a beverage bottle as well as sufficient space for a purse, small backpack or other carry-on item. The storage cabinet 74 may be an integral part of the monitor housing 78 for the passenger seated aft of the storage cabinet 74. The top of the viewing monitor enclosure 78 may be angled or beveled to discourage placement on it of drink or food items.

Seats 12A, 12B, 14A, 14B, 16A, 16B include a seat extension 80 that provides a support surface for supporting a passenger's lower legs and feet in a recline position. As shown in the illustrated example, see FIG. 1, seat extension 80 has a width that is somewhat less than that of the associated seat bottom 44 and leg rest 46 In its stowed position, the seat extension 80 is positioned under the seat bottom 44 of seat 12A.

Figure 6:
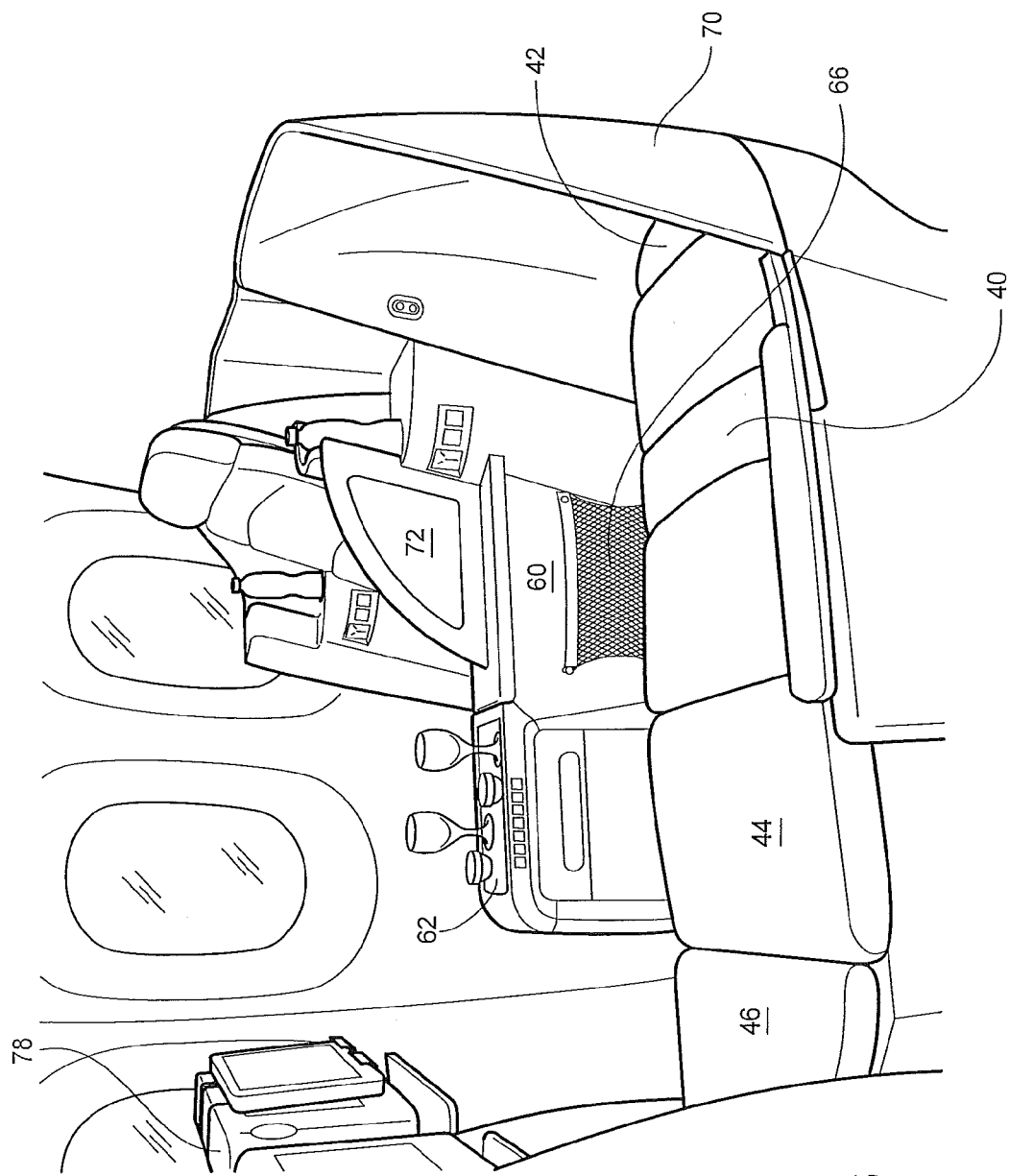
FIG. 6 is a side view of one outboard side of the cabin showing the aisle seat in a lie-flat position.

Seats 12A, 12B, 14A, 14B, 16A, 16B are provided with appropriate moveable components, actuators, and controls to enable a passenger to put the seats into various configurations, including an upright or "seated" configuration, FIG. 3; a fully reclined "lie-flat" or "sleeping" configuration in which the seat serves as a bed, FIGS. 6 and 7; and a number of intermediate configurations. As is also best shown in FIGS. 6 and 7, when the seat 12A is in the recline position, the seat back 40 becomes the "head end" of the lie-flat bed, the seat bottom 44 becomes the "middle" portion, and the seat extension 80 becomes a foot rest portion that moves into a position in alignment with the seat bottom 44 and becomes the "foot end." The foot rest portion is supported on a shelf 82 (see FIG. 5) positioned above the cabin deck at a height to support the foot rest portion in essentially the same level as the seat bottom 44, and only slightly below the height of the seat back 40 in its "head end" configuration.

As is shown generally in FIG. 2 and more specifically in FIGS. 5 and 7, the seats include an individual viewing monitor 90 positioned in the monitor housing 78 for use by an aft-seated passenger. A reading light 92 is incorporated into the shell 70 in a position to be manipulated by the passenger to provide focused directional lighting. The seat groupings in the forward-most areas of the cabin have separate modules that provide the viewing monitor, foot space, shelving and similar amenities. See FIGS. 2 and 5.

The particular arrangement shown in the figures and described herein is intended to be only one example of a seating arrangement incorporating the principles of the invention. As noted above, in other seating configurations, individual seats with aisles or other spacing between each seat may contain the same features as described above, and may be angled as described with reference to the longitudinal axis of the invention, or may be positioned at a different angle. Similarly, seat groupings may contain three or more individual seats, and the number and relative spacing and position of the arrays may be varied to suit the available space and cabin configuration. Some arrays may contain a different number of seats than other arrays. In general, a number of different specific cabin arrangements are possible while incorporating the angled and offset configurations described above, and that these configurations are equally applicable to other types of vehicles besides aircraft.

An improved aircraft passenger seat and seating arrangement is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

What is claimed is:

1. An aircraft passenger seating arrangement, comprising:
   (a) a first group of adjacent, spaced-apart and parallel seats adapted for being positioned at an offset angle in relation to a longitudinal axis of an aircraft cabin; and
   (b) a second group of adjacent, spaced-apart and parallel seats, each of the second group of seats adapted for being positioned parallel with, and aft of, the first group of adjacent seats and at an offset angle in relation to a longitudinal axis of an aircraft cabin,
   (c) a third group of adjacent, spaced-apart and parallel seats adapted for being positioned at an offset angle in relation to a longitudinal axis of an aircraft cabin;
   (d) a fourth group of adjacent, spaced-apart and parallel seats adapted for being positioned parallel with, and aft of, the third group of adjacent seats and at an offset angle in relation to a longitudinal axis of an aircraft cabin;
   (e) the third and fourth groups of seats being adapted being positioned laterally adjacent to the first and second groups of seats,
   wherein the third and fourth groups of seats are adapted for being positioned in an aircraft cabin in relation to the first and second groups of seats at an offset angle to a longitudinal axis of an aircraft cabin that is equal and opposite to the offset angle of the first and second groups of seats, and including:
   (f) a fifth group of adjacent, spaced-apart and parallel seats adapted for being positioned at an offset angle in relation to a longitudinal axis of an aircraft cabin;
   (g) a sixth group of adjacent, spaced-apart and parallel seats adapted for being positioned parallel with, and aft of, the fifth group of adjacent seats and at an offset angle in relation to a longitudinal axis of an aircraft cabin;
   (h) the fifth and sixth groups of seats adapted for being positioned in the aircraft cabin in relation to the first, second, third and fourth groups of seats at an offset angle in relation to a longitudinal axis of the aircraft cabin that is equal to the offset angle of one of the first and second groups of seats, and equal and opposite to the third and fourth groups of seats, and the fifth and sixth group of seats adapted for being positioned laterally adjacent to the third and fourth group of seats; and wherein
   (i) each of the seats of the first, second, third, fourth, fifth and sixth groups of seats:
      (1) have an individual, stationary, rigid privacy shell;
      (2) have a seat bottom, seat back, leg rest and foot rest positioned within respective privacy shells for incremental adjustable movement by the seat occupant between an upright position and a lie flat position;
      (3) are perpendicular to a laterally-adjacent seat in relation to the longitudinal axis of the aircraft cabin;
      (4) are in the same axial alignment relative to each other;
      (5) face in the same fore or aft direction in the aircraft; and
      (6) at least one seat of each group of seats includes an extendable foot rest that, when extended, is positioned at least in part between two seats of a fore-positioned group of seats.

2. An aircraft seating arrangement according to claim 1, wherein the first group of seats and the second group of seats each comprise pairs of seats.

3. An aircraft seating arrangement according to claim 1, wherein the offset angle is about 15 degrees.

4. An aircraft seating arrangement according to claim 1, wherein at least one seat of the second group of seats defines a longitudinally-extending axis that extends between two seats of the first group of seats.

* * * * *